US012035124B2

(12) United States Patent
Seefeldt

(10) Patent No.: US 12,035,124 B2
(45) **Date of Patent: *Jul. 9, 2024**

(54) VIRTUAL RENDERING OF OBJECT BASED AUDIO OVER AN ARBITRARY SET OF LOUDSPEAKERS

(71) Applicant: DOLBY LABORATORIES LICENSING CORPORATION, San Francisco, CA (US)

(72) Inventor: Alan J. Seefeldt, Alameda, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/521,793

(22) Filed: Nov. 8, 2021

(65) Prior Publication Data

US 2022/0070605 A1 Mar. 3, 2022

Related U.S. Application Data

(63) Continuation of application No. 16/758,643, filed as application No. PCT/US2018/057357 on Oct. 24, 2018, now Pat. No. 11,172,318.

(60) Provisional application No. 62/743,275, filed on Oct. 9, 2018, provisional application No. 62/578,854, filed on Oct. 30, 2017.

(51) Int. Cl.

| | |
|---|---|
| ***H04S 7/00*** | (2006.01) |
| ***H04R 5/02*** | (2006.01) |
| ***H04R 5/04*** | (2006.01) |
| ***H04S 1/00*** | (2006.01) |
| ***H04S 3/00*** | (2006.01) |

(52) U.S. Cl.
CPC ............... *H04S 7/302* (2013.01); *H04R 5/02* (2013.01); *H04R 5/04* (2013.01); *H04S 3/008* (2013.01); *H04S 2400/01* (2013.01); *H04S 2400/11* (2013.01); *H04S 2420/01* (2013.01)

(58) Field of Classification Search
None
See application file for complete search history.

(56) References Cited

U.S. PATENT DOCUMENTS 5,862,227 A 1/1999 Orduna-Bustamante
8,270,642 B2 9/2012 Kuhn
(Continued)

FOREIGN PATENT DOCUMENTS

CN 101868984 10/2010
CN 102007780 4/2011
(Continued)

OTHER PUBLICATIONS

I C. Q. Robinson, S. Mehta, and N. Tsingos, "Scalable Format and Tools to Extend the Possibilities of Cinema Audio," SMPTE Motion Imaging Journal, vol. 121, No. 8, pp. 63-69, Nov. 2012.
(Continued)

*Primary Examiner* — Qin Zhu

(57) ABSTRACT

An apparatus and method of rendering audio. The method includes deriving filters by defining a binaural error, defining an activation penalty, and minimizing a cost function that is a combination of the binaural error and the activation penalty. In this manner, the listening experience is improved by reducing the signal level output by loudspeakers further from an audio object's desired position.

20 Claims, 10 Drawing Sheets

400

(56) References Cited

U.S. PATENT DOCUMENTS

| | | | |
|---|---|---|---|
| 8,693,713 | B2 | 4/2014 | Chen |
| 9,521,488 | B2 | 12/2016 | Oishi |
| 9,622,011 | B2 | 4/2017 | Seefeldt |
| 9,712,939 | B2 | 7/2017 | Mateos Sole |
| 2005/0013442 | A1 | 1/2005 | Ohta |
| 2009/0238371 | A1 | 9/2009 | Rumsey |
| 2009/0304189 | A1 | 12/2009 | Vinton |
| 2014/0064526 | A1 | 3/2014 | Otto |
| 2015/0131824 | A1 | 5/2015 | Nguyen |
| 2015/0208190 | A1 | 7/2015 | Hooks |
| 2015/0245157 | A1 | 8/2015 | Seefeldt |
| 2015/0358754 | A1 | 12/2015 | Koppens |
| 2016/0080886 | A1 | 3/2016 | De Bruijn |
| 2016/0212559 | A1 | 7/2016 | Mateos Sole |
| 2016/0323688 | A1 | 11/2016 | Lee |
| 2017/0013388 | A1 | 1/2017 | Neukam |
| 2017/0019746 | A1 | 1/2017 | Oh |
| 2017/0180907 | A1 | 6/2017 | Kuhr |
| 2017/0188168 | A1 | 6/2017 | Lyren |
| 2017/0208417 | A1 | 7/2017 | Thakur |
| 2017/0238117 | A1 | 8/2017 | Hu |
| 2017/0280264 | A1 | 9/2017 | Wang |
| 2018/0359596 | A1 | 12/2018 | Breebaart |
| 2019/0069110 | A1 | 2/2019 | Gorzel |
| 2019/0253801 | A1 | 8/2019 | Arteaga |
| 2020/0178015 | A1 | 6/2020 | Mcgrath |

FOREIGN PATENT DOCUMENTS

| | | |
|---|---|---|
| CN | 104604255 B | 11/2016 |
| CN | 107094277 | 8/2017 |
| WO | 2012068174 | 5/2012 |
| WO | 2016131479 | 8/2016 |
| WO | 2017035281 | 3/2017 |
| WO | 2017087650 | 5/2017 |
| WO | 2018064410 | 4/2018 |

OTHER PUBLICATIONS

Bauck, J. and Cooper D., "Generalized Transaural Stereo and Applications", Journal of the Audio Engineering Society, Sep. 1996, vol. 44, No. 9, pp. 683-705.

Brown, P. et al. "A Structural Model for Binaural Sound Synthesis", IEEE Transactions on Speech and Audio Processing, Sep. 1998, vol. 6, No. 5, pp. 476-478.

CIPIC HRTF Database, Release 1.1, Oct. 21, 2001, http://interface.cipic.ucdavis.edu/.

Gardner, W. "3-D Audio Using Loudspeakers", Kluwer Academic, 1998.

https://en.wikipedia.org/wiki/Lagrange_multiplier.

Junho, L. et al "Robust Crosstalk Cancellation Based on Energy-Based Control" 34th International Conference: New Trends in Audio for Mobile and Handheld Devices: Aug. 2008.

Lacouture, Parodi Yesenia, et al. "Analysis of Design Parameters for Crosstalk Cancellation Filters Applied to Different Loudspeaker Configurations" vol. 59, No. 5, May 1, 2011, pp. 304-320.

Nelson, P.A. et al "Multichannel Signal Processing Techniques in the Reproduction of Sound", Journal of the Audio Engineering Society, New York, vol. 44, No. 11, Nov. 1, 1996, pp. 973-989.

V. Pulkki, "Virtual sound source positioning using vector base amplitude panning," Journal of the Audio Engineering Society, vol. 45, No. 6, pp. 456-466, 1997.

VIRTUAL RENDERING OF OBJECT BASED AUDIO OVER AN ARBITRARY SET OF LOUDSPEAKERS

CROSS REFERENCE TO RELATED APPLICATIONS

This application is a continuation of U.S. patent application Ser. No. 16/758,643 filed Nov. 5, 2020, which is a National Phase entry of PCT Patent Application No. PCT/US2018/057357, having international filing date of Oct. 24, 2018, which claims priority to U.S. Provisional Application No. 62/578,854 filed Oct. 30, 2017 for "Virtual Rendering of Object Based Audio over an Arbitrary Set of Loudspeakers" and claims the benefit of U.S. Provisional Application No. 62/743,275 filed Oct. 9, 2018 for "Virtual Rendering of Object Based Audio over an Arbitrary Set of Loudspeakers," each of which is incorporated by reference in its entirety.

BACKGROUND

The present invention relates to audio processing, and in particular, to rendering object based audio over an arbitrary set of loudspeakers.

Unless otherwise indicated herein, the approaches described in this section are not prior art to the claims in this application and are not admitted to be prior art by inclusion in this section.

Object based audio generally refers to generating loudspeaker feeds based on audio objects. Object based audio may generally be contrasted with channel based audio. In channel based audio, each channel corresponds to a loudspeaker. For example, 5.1 surround sound is channel based, with the "5" referring to left, right, center, left surround and right surround loudspeakers and their five corresponding channels, and the "1" referring to a low-frequency effects speaker and its corresponding channel. On the other hand, object based audio renders audio objects for output by loudspeakers whose numbers and arrangements need not be defined by the audio objects; instead, each audio object may include location metadata that is used during the rendering process so that the audio for that audio object is output by the loudspeakers such that the audio object is perceived to originate at the desired location.

Binaural audio generally refers to audio that is recorded, or played back, in such a way that accounts for the natural ear spacing and head shadow of the ears and head of a listener. The listener thus perceives the sounds to originate in one or more spatial locations. Binaural audio may be recorded by using two microphones placed at the two ear locations of a dummy head. Binaural audio may be rendered from audio that was recorded non-binaurally by using a head-related transfer function (HRTF) or a binaural room impulse response (BRIR). Binaural audio may be played back using headphones. Binaural audio generally includes a left signal (to be output by the left headphone or left loudspeaker), and a right signal (to be output by the right headphone or right loudspeaker). Binaural audio differs from stereo in that stereo audio may involve loudspeaker crosstalk between the loudspeakers.

The so-called "virtual" rendering of spatial audio over a pair of loudspeakers commonly involves the creation of a stereo binaural signal which is then fed through a cross-talk canceller to generate left and right speaker signals. The binaural signal represents the desired sound arriving at the listener's left and right ears and is synthesized to simulate a particular audio scene in 3D space, containing possibly a multitude of sources at different locations. The crosstalk canceller attempts to eliminate or reduce the natural crosstalk inherent in stereo loudspeaker playback so that the left channel of the binaural signal is delivered substantially to the left ear only of the listener and the right channel to the right ear only, thereby preserving the intention of the binaural signal. Through such rendering, audio objects are placed "virtually" in 3D space since a loudspeaker is not necessarily physically located at the point from which a rendered sound appears to emanate. The theory and history of such rendering is discussed extensively by W. Gardner, "3-D Audio Using Loudspeakers" (Kluwer Academic, 1998).

U.S. Application Pub. No. 2015/0245157 discusses virtual rendering of object based audio through binaural rendering of each object followed by panning of the resulting stereo binaural signal between a plurality of cross-talk cancellation circuits feeding a corresponding plurality of speaker pairs.

FIG. 1 is a block diagram of a loudspeaker system 100. The loudspeaker system 100 is used to illustrate the design of a cross-talk canceller, which is based on a model of audio transmission from the loudspeakers 102 and 104 to a listener's ears 106 and 108. Signals $s_L$ and $s_R$ represent the signals sent from the left and right loudspeakers 102 and 104, and signals $e_L$ and $e_R$ represent the signals arriving at the left and right ears 106 and 108 of the listener. Each ear signal is modeled as the sum of the left and right loudspeaker signals each filtered by a separate linear time-invariant transfer function H modeling the acoustic transmission from each speaker to that ear. These four transfer functions may be modeled using head related transfer functions (HRTFs) selected as a function of an assumed speaker placement with respect to the listener.

The model depicted in FIG. 1 can be written in matrix equation form as follows:

$$\begin{bmatrix} e_L \\ e_R \end{bmatrix} = \begin{bmatrix} H_{LL} & H_{RL} \\ H_{LR} & H_{RR} \end{bmatrix} \begin{bmatrix} s_L \\ s_R \end{bmatrix} \text{ or } e = Hs \tag{1}$$

Equation 1 reflects the relationship between signals at one particular frequency and is meant to apply to the entire frequency range of interest, and the same applies to all subsequent related equations. A crosstalk canceller matrix C may be realized by inverting the matrix H:

$$C = H^{1} = \frac{1}{H_{LL}H_{RR} - H_{LR}H_{RL}} \begin{bmatrix} H_{RR} & -H_{RL} \\ -H_{LR} & H_{LL} \end{bmatrix} \tag{2}$$

Given left and right binaural signals $b_L$ and $b_R$, the speaker signals $s_L$ and $s_R$ are computed as the binaural signals multiplied by the crosstalk canceller matrix:

$$s = Cb \text{ where } b = \begin{bmatrix} b_L \\ b_R \end{bmatrix} \tag{3}$$

Substituting Equation 3 into Equation 1 and noting that $C=H^{-1}$ yields:

$$e = HCb = b \tag{4}$$

In other words, generating speaker signals by applying the crosstalk canceller to the binaural signal yields signals at the ears of the listener equal to the binaural signal. This assumes that the matrix H perfectly models the physical acoustic transmission of audio from the speakers to the listener's ears. In reality, this will not be the case, so Equation 4 will in general be approximated. In practice, however, this approximation is close enough that a listener will substantially perceive the spatial impression intended by the binaural signal b.

Oftentimes, the binaural signal b is synthesized from a monaural audio object signal o through the application of binaural rendering filters $B_L$ and $B_R$:

$$\begin{bmatrix} b_L \\ b_R \end{bmatrix} = \begin{bmatrix} B_L \\ B_R \end{bmatrix} o \text{ or } b = Bo \tag{5}$$

The rendering filter pair B is most often given by a pair of HRTFs chosen to impart the impression of the object signal o emanating from an associated position in space relative to the listener. In equation form, this relationship may be represented as:

$$B=\text{HRTF}\{pos(o)\} \tag{6}$$

Here pos(o) represents the desired position of object signal o in 3D space relative to the listener. This position may be represented in Cartesian (x,y,z) coordinates (e.g., Cartesian distance) or any other equivalent coordinate system such as polar (e.g., angular distance including a distance and a direction). This position might also varying in time to simulate movement of the object through space. The function HRTF{ } is meant to represent a set of HRTFs addressable by position. Many such sets measured from human subjects in a laboratory exist, such as the University of California Davis' Center for Image Processing and Integrated Computing (CIPIC) database, described at <interface.cipic.ucdavis.edu>. Alternatively, the set might be comprised of a parametric model such as the spherical head model described in P. Brown and R. Duda, "A Structural Model for Binaural Sound Synthesis", *IEEE Transactions on Speech and Audio Processing*, September 1998, Vol. 6, No. 5, pp. 476-478. In a practical implementation, the HRTFs used for constructing the crosstalk canceller are often chosen from the same set used to generate the binaural signal, though this is not a requirement.

In many applications, a multitude of objects at various positions in space are simultaneously rendered. In such a case, the binaural signal is given by a sum of object signals with their associated HRTFs applied:

$$b = \sum_{k=1}^{K} B_k o_k \text{ where } B_k = HRTF\{pos(o_k)\} \tag{7}$$

With this multi-object binaural signal, the entire rendering chain to generate the speaker signals is given by:

$$s = C\sum_{k=1}^{K} B_k o_k \tag{8}$$

In many applications, the object signals $o_k$ are given by the individual channels of a multichannel signal, such as a 5.1 signal comprised of left, center, right, left surround, and right surround. In this case, the HRTFs associated with each object may be chosen to correspond to the fixed speaker positions associated with each channel. In this way, a 5.1 surround system may be virtualized over a set of stereo loudspeakers. In other applications the objects may be sources allowed to move freely anywhere in 3D space. In the case of a next generation spatial audio format, as described in C. Q. Robinson, S. Mehta, and N. Tsingos, "Scalable Format and Tools to Extend the Possibilities of Cinema Audio," *SMPTE Motion Imaging Journal*, vol. 121, no. 8, pp. 63-69, November 2012, the set of objects in Equation 8 may consist of both freely moving objects and fixed channels.

The two speaker/one listener cross-talk canceller can be generalized to an arbitrary number of speakers located at arbitrary positions with respect to an arbitrary number of listeners also at arbitrary positions. This is achieved by extending Equation 1 from two speakers and one listener to M speakers and N listeners:

$$\begin{bmatrix} e_{L1} \\ e_{R1} \\ e_{L2} \\ e_{R2} \\ \vdots \\ e_{LN} \\ e_{RN} \end{bmatrix} = \begin{bmatrix} H_{L11} & H_{L12} & \cdots & H_{L1M} \\ H_{R11} & H_{R12} & \cdots & H_{R1M} \\ H_{L21} & H_{L22} & \cdots & H_{L2M} \\ H_{R21} & H_{R22} & \cdots & H_{R2M} \\ \vdots & \vdots & \vdots & \vdots \\ H_{LN1} & H_{LN2} & \cdots & H_{LNM} \\ H_{RN1} & H_{RN2} & \cdots & H_{RNM} \end{bmatrix} \begin{bmatrix} s_1 \\ s_2 \\ \vdots \\ s_M \end{bmatrix} \text{ or } e = Hs \tag{9}$$

This extension is discussed in J. Bauck and D. Cooper, "Generalized Transaural Stereo and Applications", *Journal of the Audio Engineering Society*, September 1996, Vol. 44, No. 9, pp. 683-705 along with a proposed solution. In general, M, the number of speakers, and 2N, the number of ears, are not equal, and therefore the 2N×M acoustic transmission matrix H is not invertible. As such, Bauck and Cooper propose using the pseudo inverse of H, denoted $H^+$, to generate the speaker signals s according to:

$$s=H^+b \tag{10}$$

where b is the vector of desired left and right binaural signals for each of the N listeners.

There are two general cases to obtain a solution for s. In one case, if the number of ears is larger than the number of speakers, 2N>M, then in general no solution for s exists such that the desired binaural signal b is achieved exactly at the ears of the N listeners. In this case, the solution for s in Equation 10 minimizes the squared error between the signal at the ears e and the desired binaural signal b:

$$(e-b)^*(e-b)=(Hs-b)^*(Hs-b) \tag{11}$$

where * denotes the Hermitian transpose.

In another case, if the number of ears is smaller than the number of speakers, 2N<M, then in general an infinite number of solutions can be found which all result in the error of Equation 11 being zero. In this case, the particular solution defined by Equation 10 achieves the minimum signal energy over this infinite set of solutions.

However, in either of these cases above, the solution given by Equation 10 will in general yield a speaker vector s for which all of the individual speaker signals s m contain perceptually significant amounts of energy. In other words, the solution is not sparse across the set of loudspeakers. This lack of sparsity is problematic because the assumed acoustic transmission matrix H is in practice always an approximation to reality, particularly with respect to the listener positions (e.g., listeners tend to move). If this mismatch between model and reality becomes large, then the listeners may hear the perceived location of an audio object $o_k$ far from its intended spatial position, particularly if speakers distant from the intended position of the object contain significant amounts of energy.

Other spatial audio rendering techniques avoid this problem by, for each audio object being rendered, activating only loudspeakers physically closest to the intended spatial position of that object. Such systems include amplitude panners, and these systems are relatively robust to listener movement. See, e.g., V. Pulkki, "Virtual sound source positioning using vector base amplitude panning," Journal of the Audio Engineering Society, vol. 45, no. 6, pp. 456-466, 1997; and U.S. Application Pub. No. 2016/0212559.

SUMMARY

However, the amplitude panners discussed above do not provide the same flexibility in perceived placement of audio sources afforded by cross-talk cancellation, particularly for speaker setups that do not fully encircle a listener. Given the above problems and lack of solutions, embodiments are directed toward combining the benefits of generalized virtual spatial rendering described by Equation 9 and perceptually beneficial sparsity of speaker activation.

According to an embodiment, a method of rendering audio includes deriving a plurality of filters, wherein each of the plurality of filters is associated with a corresponding one of a plurality of loudspeakers. Deriving the plurality of filters includes defining a binaural error for an audio object using the plurality of filters, defining an activation penalty for the audio object using the plurality of filters, and minimizing a cost function that is a combination of the binaural error and the activation penalty for the plurality of filters. The audio object is associated with a desired perceived position. The method further includes rendering the audio object using the plurality of filters to generate a plurality of rendered signals. The method further includes outputting, by the plurality of loudspeakers, the plurality of rendered signals.

The binaural error may be a difference between desired binaural signals related to at least one listener position and modeled binaural signals related to the at least one listener position. The binaural error may be zero. The desired binaural signals may be defined based on the audio object and the desired perceived position of the audio object. The desired binaural signals may be defined using one of a database of head-related transfer functions (HRTFs) and a parametric model of HRTFs. The modeled binaural signals may be defined by modeling a playback of the plurality of rendered signals, through the plurality of loudspeakers having a plurality of nominal loudspeaker positions, based on the at least one listener position. The modeled binaural signals may be defined using one of a database of head-related transfer functions (HRTFs) and a parametric model of HRTFs.

The activation penalty may associate a cost with assigning signal energy among the plurality of loudspeakers. The activation penalty may be a distance penalty, wherein the distance penalty is defined based on the plurality of rendered signals, a plurality of nominal loudspeaker positions for the plurality of loudspeakers, and the desired perceived position of the audio object. The distance penalty may be defined using one of a Cartesian distance and an angular distance.

The cost function may be a combination function that is monotonically increasing in both A and B, wherein A corresponds to the binaural error and B corresponds to the activation penalty. The cost function may be one of A+B, AB, $e^{A+B}$, and $e^{AB}$.

The audio object may be one of a plurality of audio objects, wherein the plurality of audio objects is rendered using the plurality of filters, and wherein each of the plurality of audio objects has an associated desired perceived position.

The plurality of loudspeakers may include a first loudspeaker and a second loudspeaker, wherein the first loudspeaker has a nominal position that is a first distance from the desired perceived position of the audio object, and wherein the second loudspeaker has a nominal position that is a second distance from the desired perceived position of the audio object, wherein the first distance is greater than the second distance. The activation penalty may be a distance penalty, wherein the distance penalty becomes larger when, for a given overall level of the plurality of rendered signals, more of the given overall level is associated with the first loudspeaker than is associated with the second loudspeaker.

The plurality of loudspeakers may have a plurality of nominal loudspeaker positions, wherein each of the plurality of nominal loudspeaker positions is one of a first position and a second position, wherein the first position is an actual loudspeaker position of a corresponding one of the plurality of loudspeakers, and wherein the second position is other than the actual loudspeaker position.

One of the plurality of loudspeakers may have a nominal loudspeaker position, wherein the nominal loudspeaker position is derived by expanding one or more physical positions of the plurality of loudspeakers.

The plurality of filters may be independent of the audio object. (For example, the filters may be calculated based on one or more potential positions for the audio object, independently of the content of the audio object.) The plurality of filters may be stored as a lookup table indexed by the desired perceived position of the audio object.

The plurality of loudspeakers may have a plurality of physical positions, wherein the plurality of physical positions are determined in a setup phase.

According to another embodiment, a non-transitory computer readable medium stores a computer program that, when executed by a processor, controls an apparatus to execute processing including one or more of the methods discussed above.

According to another embodiment, an apparatus renders audio and includes a plurality of loudspeakers and at least one processor. The at least one processor is configured to derive a plurality of filters, wherein each of the plurality of filters is associated with a corresponding one of the plurality of loudspeakers. Deriving the plurality of filters includes defining a binaural error for an audio object using the plurality of filters, defining an activation penalty for the audio object using the plurality of filters, and minimizing a cost function that is a combination of the binaural error and the activation penalty for the plurality of filters. The audio object is associated with a desired perceived position. The at least one processor is further configured to render the audio object using the plurality of filters to generate a plurality of rendered signals, and the plurality of loudspeakers is configured to output the plurality of rendered signals.

The apparatus may include similar details to those discussed above regarding the method.

The following detailed description and accompanying drawings provide a further understanding of the nature and advantages of various implementations.

DETAILED DESCRIPTION

Described herein are techniques for rendering audio. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

The following description uses the term sweet spot. In general, a sweet spot in acoustics refers to the listening position with respect to two or more loudspeakers, where a listener is capable of hearing the audio mix the way it was intended to be heard by the mixer. For example, the sweet spot for a standard stereo layout is a point equidistant from the two loudspeakers. In general, however, a spatial audio rendering system may be configured through appropriate filtering at the loudspeakers to place the sweet spot at an arbitrary point with respect to a particular configuration of loudspeakers. The sweet spot may be conceptualized as a point, and may be perceived as an area; a listener's perception of the sound is generally the same within the area, and the listener's perception of the sound degrades outside of the area.

Figure 2A:
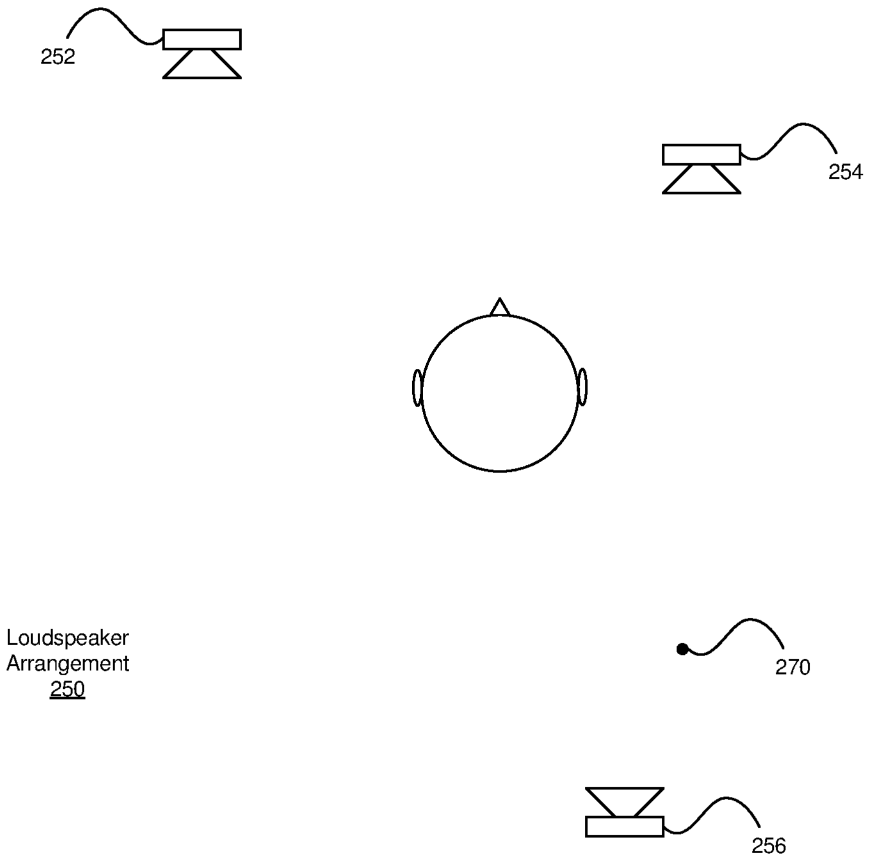
FIG. 2A is a top view of an arrangement 250 of loudspeakers.

FIG. 2A is a top view of an arrangement 250 of loudspeakers. The arrangement 250 includes an arbitrary number of loudspeakers (shown are three loudspeakers 252, 254 and 256) that are placed in arbitrary positions. Here "arbitrary" means that their numbers or positions need not necessarily be defined by the audio signals to be output. The arrangement 250 may be contrasted with channel-based systems or with rendering systems with defined filters. For example, a 5.1-channel surround system uses six loudspeakers, five of which have defined positions; changing those positions results in changes to the sweet spot of the audio output. As another example, a rendering system with defined filters has filters that are defined according to the positions of the loudspeakers; if the speakers are re-arranged, the filters need to be re-defined, otherwise the sweet spot of the audio output changes.

In contrast to many existing systems, embodiments are useful for outputting audio from arbitrary loudspeaker arrangements such as the arrangement 250. However, before discussing a full arbitrary arrangement (see, e.g., FIGS. 7A-7B), a more fixed arrangement of FIG. 2B is discussed.

Figure 1:
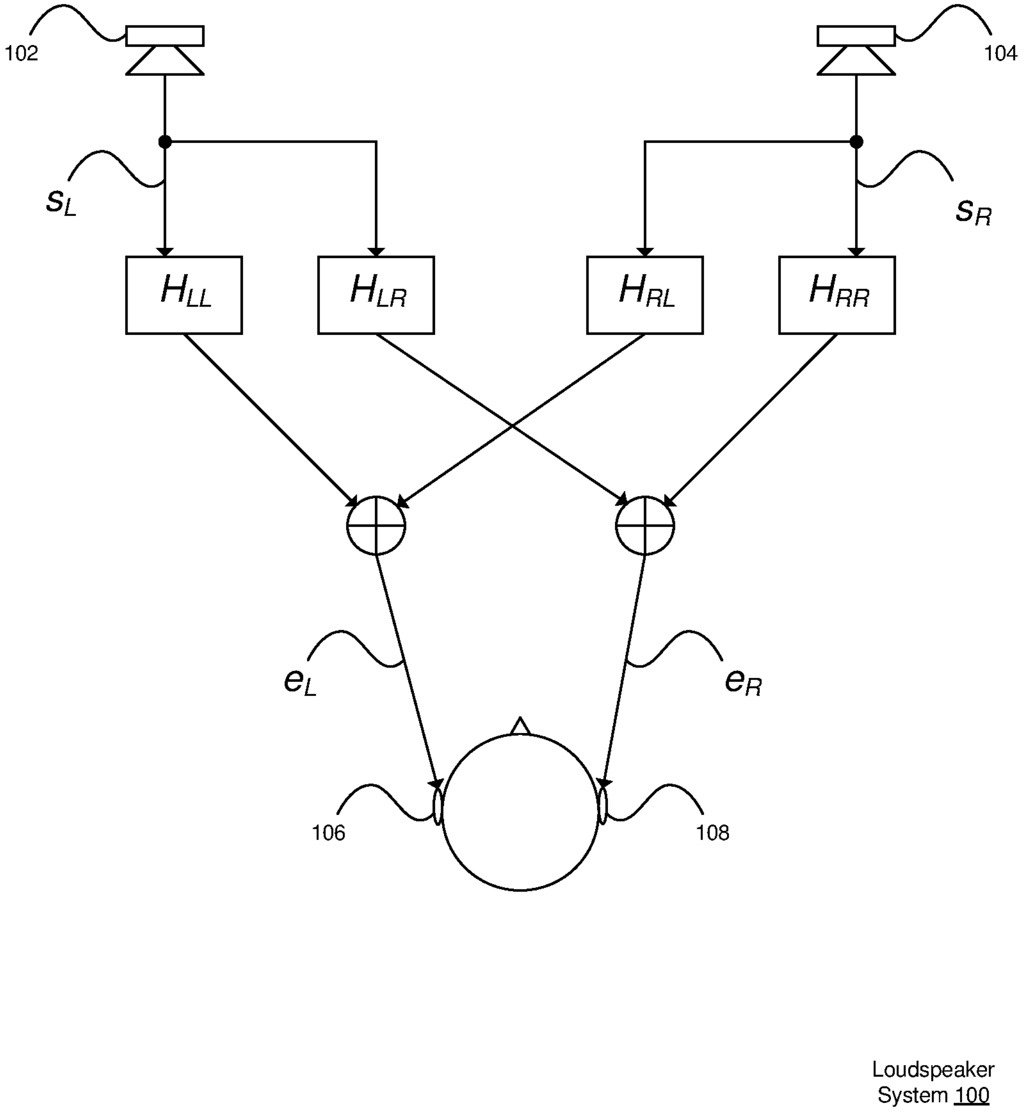
FIG. 1 (Prior Art)
FIG. 1 is a block diagram of a loudspeaker system 100.
Figure 2B:
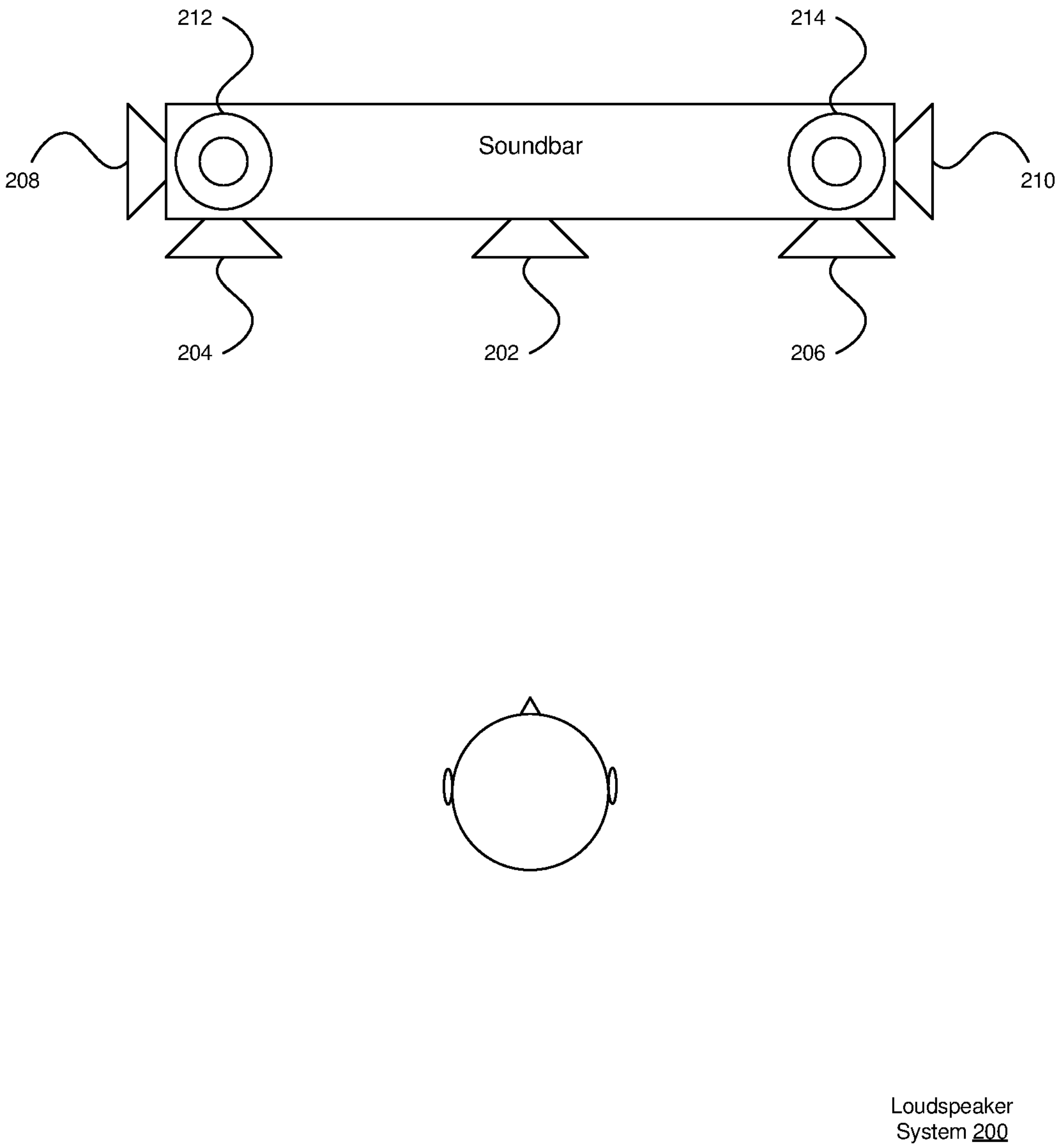
FIG. 2B is a top view of a loudspeaker system 200.

FIG. 2B is a top view of a loudspeaker system 200. The loudspeaker system 200 is in the form factor of a sound bar and includes seven loudspeakers: a center loudspeaker 202, a left front loudspeaker 204, a right front loudspeaker 206, a left side loudspeaker 208, a right side loudspeaker 210, a left upward loudspeaker 212, and a right upward loudspeaker 214. The left front loudspeaker 204 and the right front loudspeaker 206 may be referred to as the front pair; the left side loudspeaker 208 and the right side loudspeaker 210 may be referred to as the side pair; and the left upward loudspeaker 212 and the right upward loudspeaker 214 may be referred to as the upward pair. U.S. Application Pub. No. 2015/0245157 discusses a similar form factor for virtual rendering of object based audio through binaural rendering of each object followed by panning of the resulting stereo binaural signal between a plurality of cross-talk cancellation circuits feeding a corresponding plurality of speaker pairs. More specifically in U.S. Application Pub. No. 2015/0245157, a cross-talk canceller (see FIG. 1) is associated with each of the three pairs, and objects meant to be in front of the listener are panned to the front pair, objects meant to be behind the listener are panned to the side pair, and objects meant to be above the listener are panned to the upward pair. (The center loudspeaker 202 is unassociated with a cross-talk canceller.) However, unlike the system described in U.S. Application Pub. No. 2015/0245157, the loudspeaker system 200 derives its filters in a different way and is not constrained to operate on a set of one or more loudspeaker pairs, as further detailed below.

Figure 3:
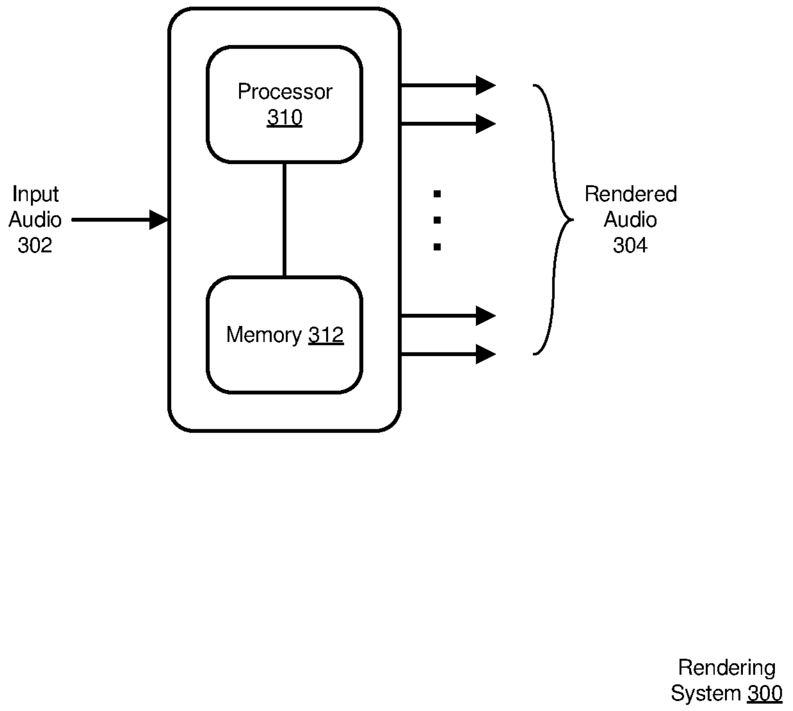
FIG. 3 is a block diagram of a rendering system 300.

FIG. 3 is a block diagram of a rendering system 300. The rendering system 300 may be a component of the loudspeaker system 200 (see FIG. 2B). In general, the rendering system 300 receives an input audio signal 302 and generates one or more rendered audio signals 304. (For example, when the rendering system 300 is implemented in the loudspeaker system 200, the rendering system 300 generates seven rendered audio signals 304.) The input audio signal 302 may include audio objects. Each of the rendered audio signals 304 is provided to other components (not shown), such as an amplifier for output by a loudspeaker. The rendering system 300 includes a processor 310 and a memory 312.

The processor 310 receives the input audio signal 302 and applies one or more filters to generate the rendered audio signals 304. The processor 310 may execute a computer program that controls its operation. The memory 312 may store the computer program and the filters. The processor 310 may include a digital signal processor (DSP), and the processor 310 and the memory 312 may be implemented as components of a programmable logic device (PLD). The rendering system 300 may include other components that (for brevity) are not shown.

As discussed above, each filter is associated with a corresponding one of the rendered audio signals 304. Further details of the filters are provided below.

Figure 4A:
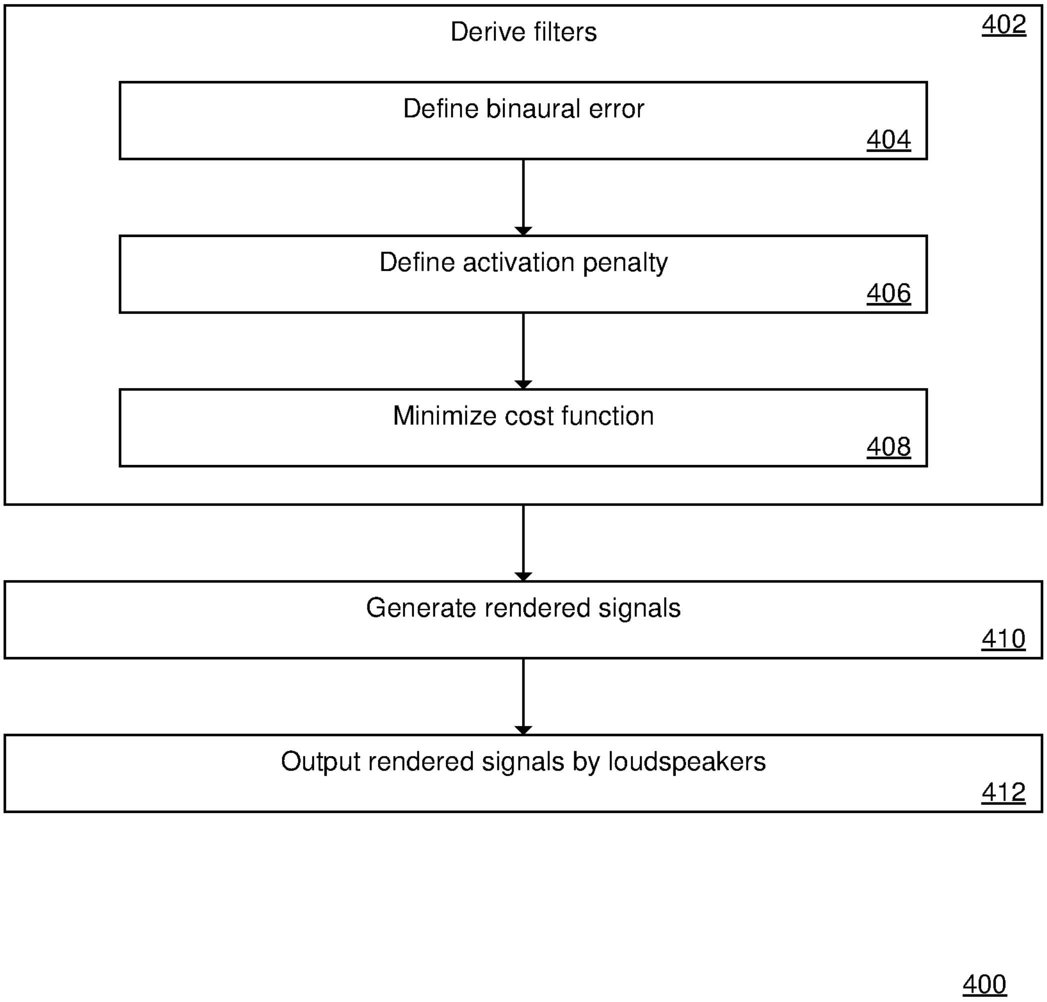
FIG. 4A is a flowchart of a method 400 of rendering audio.

FIG. 4A is a flowchart of a method 400 of rendering audio. The method 400 may be implemented by the rendering system 300 (see FIG. 3), for example as controlled by one or more computer programs that implement the method. The method 400 may be performed by a device such as the loudspeaker system 200 (see FIG. 2B).

At 402, a plurality of filters are derived. Each of the filters is associated with a corresponding one of a plurality of loudspeakers. For example, for the loudspeaker system 200, each of the filters may be derived for a corresponding one of the six loudspeakers 204, 206, 208, 210, 212 and 214. The center loudspeaker 202 may also be associated with a filter derived by this method. Deriving the filters includes the sub-steps 404, 406 and 408.

At 404, a binaural error for a desired perceived position of an audio object is defined as a function of the filters to be computed. The desired perceived position may be indicated in the metadata of the audio object. (This position is referred to as the "desired perceived position" because the system may not actually achieve this goal precisely.) The binaural error is a difference between desired binaural signals related to at least one listener position and modeled binaural signals related to the at least one listener position. The desired binaural signals are defined based on the audio object and the desired perceived position of the audio object, from the perspective of the at least one listener position. The modeled binaural signals are defined by modeling a playback of the plurality of rendered signals, through the plurality of loudspeakers having a plurality of loudspeaker positions, based on the at least one listener position.

At 406, an activation penalty for the audio object is defined based on the plurality of rendered signals. The activation penalty may be based on the desired perceived position of the audio object or on other components, as discussed below. In general, the activation penalty associates a cost with assigning signal energy to the various loudspeakers and imparts a degree of sparsity to the filter derivation process. One example implementation of the activation penalty is a distance penalty. The distance penalty for the audio object is defined based on the plurality of rendered signals, a plurality of nominal loudspeaker positions for the plurality of loudspeakers, and the desired perceived position of the audio object. The distance penalty is defined such that it becomes larger when, for a given overall level of the plurality of rendered signals, more of the given overall level is associated with a first loudspeaker whose nominal position is further, than a second loudspeaker, from the desired perceived position. (The "nominal" positions of the loudspeakers are further discussed below; unless otherwise noted, the nominal position of a loudspeaker may be considered to relate to its physical position.) For example, using the loudspeaker system 250 (see FIG. 2A), when point 270 corresponds to the desired perceived position of the audio object, the loudspeaker 256 is closest, the loudspeaker 254 is next closest, and the loudspeaker 252 is furthest. Thus, the distance penalty is larger when more of the overall level of the rendered signal at the point 270 is associated with the loudspeaker 252 than with the loudspeaker 256. Furthermore, the loudspeaker 254 may have a distance penalty less than that of the loudspeaker 252 and greater than that of the loudspeaker 256.

Another example component of the activation penalty is an audibility penalty. In general, the audibility penalty applies a higher cost to nominal loudspeaker positions based on their relation to a defined position. For example, if the loudspeakers are in one room that is adjacent to a baby's room, the audibility penalty may apply a higher cost to the loudspeakers nearby the baby's room.

At 408, a cost function that is a combination of the binaural error and the activation penalty for the plurality of filters is minimized. The cost function is a combination function that is monotonically increasing in both A and B, wherein A corresponds to the binaural error and B corresponds to the activation penalty. Examples of such a cost function include A+B, AB, $e^{A+B}$, and $e^{AB}$.

(Often, the minimization of the cost function may be implemented using a closed-form mathematical solution, as further discussed below. Thus, the binaural error and the activation penalty are discussed above as being "defined" and not "calculated". However, when a closed-form solution is not available, the cost function may be minimized using iteration of the binaural error and the activation penalty, which may involve the explicit calculation thereof.)

As an example, the processor 310 (see FIG. 3) may derive the filters (see 402) by defining the binaural error of the desired perceived position of an audio object in the input audio signal 302 (see 404), defining the activation penalty for the audio object (see 406), and minimizing the cost function (see 408).

At 410, the audio object is rendered using the plurality of filters to generate a plurality of rendered signals. For example, the processor 310 (see FIG. 3) may generate the rendered signals 304 by rendering the audio object using the filters.

At 412, the plurality of rendered signals are output by the plurality of loudspeakers. For example, the loudspeaker system 200 (see FIG. 2B) may output the rendered signals 304 (see FIG. 3) using the loudspeakers 204, 206, 208, 210, 212 and 214. The output from each loudspeaker is generally an audible sound.

The filter derivation (see 402) may be performed using dynamic filter derivation, precomputed filter derivation, or a combination of the two.

In the dynamic case, the processor (see 310 in FIG. 3) receives an audio object that includes the desired perceived position information, then derives the filter based on the received desired perceived position information. In the precomputed case, the processor derives a number of filters for a variety of different perceived positions, and stores the filters in the memory (see 312 in FIG. 3, for example in a lookup table); when an audio object is received, the processor uses the desired perceived position information in the audio object to select the appropriate filter to use for that audio object. In the combination case, the processor selectively operates as per the dynamic case or the precomputed case based on various criteria, such as the closeness of the desired perceived position information in the audio object to that in the precomputed filters, the availability of computational resources, etc. The choice between the three cases may be made depending upon design criteria. For example, when the system has computational resources available, the system implements the dynamic case.

The filter derivation (see 402) may be performed locally, remotely, or a combination of the two. For local filter derivation, the rendering system (e.g., the rendering system 300 of FIG. 3) itself derives the filters. For remote filter derivation, the rendering system communicates with remote components (e.g., a cloud-based filter derivation machine) to derive the filters. For example, the local rendering system may run a calibration script and may send the raw data (e.g., relating to speaker positions) to the cloud machine. In the cloud, the position of the speakers is determined and subsequently the rendering filters as well. The lookup table of rendering filters is then sent back down to the rendering system, where they are applied during real-time playback.

Figure 4B:
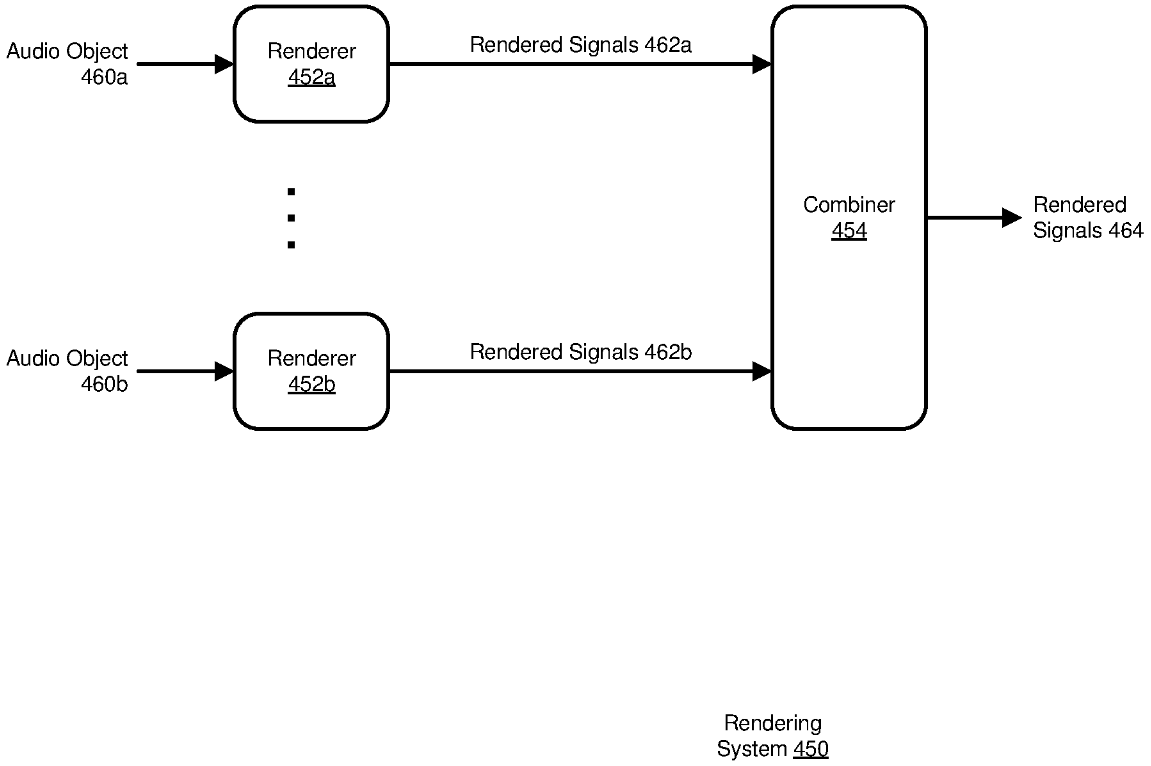
FIG. 4B is a block diagram of a rendering system 450.

Although one audio object is discussed above in relation to FIG. 4A, the method 400 may also be used for a plurality of audio objects that are received (e.g., via the input audio signal 302 of FIG. 3. FIG. 4B provides more details for the multiple audio objects case.

FIG. 4B is a block diagram of a rendering system 450. The rendering system 450 generally performs the method 400 (see FIG. 4A), and may be implemented by a processor and a memory (e.g., as in the rendering system 300 of FIG. 3). The rendering system 450 includes a number of renderers 452 (two shown, 452*a* and 452*b*) and a combiner 454.

The number of renderers 452 generally corresponds to the number of audio objects to be rendered at a given time. Here, two renderers 452 are shown; the renderer 452*a* receives an audio object 460*a*, and the renderer 452*b* receives an audio object 460*b*. Each of the renderers 452 renders the audio object using the appropriate filters (e.g., as derived according to 402 in FIG. 4A) to generate one or more rendered signals 462. Here, the renderer 452*a* renders the audio object 460*a* to generate the one or more rendered signals 462*a*, and the renderer 452*b* renders the audio object 460*b* to generate the one or more rendered signals 462*b*. Each of the rendered signals 462 corresponds to one of the loudspeakers (not shown) that are to output the rendered signals 462. For example, when the rendering system 405 is implemented in the loudspeaker system 200 (see FIG. 2), the rendered signals (e.g., 462*a*) correspond to each of the signals to be output from the six loudspeakers.

The combiner 454 receives the rendered signals 462 from the renderers 452 and combines the respective rendered signal for each loudspeaker, to result in one or more rendered signals 464. Generally, the combiner 454 sums the contribution of each of the renderers 452 for each respective one of the rendered signals 462 for a given one of the loudspeakers. For example, if the audio object 460*a* is rendered to be output by the loudspeakers 208 and 204 (see FIG. 2), and the audio object 460*b* is rendered to be output by the loudspeakers 204 and 206, then the combiner combines the rendered signals 462*a* and 462*b* such that the component signals corresponding to the loudspeaker 204 are summed.

The rendered signals 464 may then be output (see 412 in FIG. 4A).

Further details of the filters (see 402), including the binaural error (see 404), the activation penalty (see 406), and the cost function (see 408) are provided below.

Detailed Embodiments

In general, embodiments are directed toward rendering a set of one or more audio object signals, each with an associated and possibly time-varying desired perceived position, for intended playback over a set of two or more loudspeakers located at assumed physical positions. The rendering for each audio object signal is achieved through filtering the audio object signal with one or more filters, where each filter is associated with one of the set of loudspeakers. The filters are derived, at least in part, by minimizing a combination of two components. The first component is an error between (a) desired binaural signals at a set of assumed one or more physical listening positions, said desired signals derived from said audio object signal and its associated desired perceived position and (b) a model of binaural signals generated at the set of one or more listening positions by the set of loudspeakers. The model of binaural signals is derived from the rendered signals (also referred to as the set of filtered audio object signals). The second component is an activation penalty that is a function of the filtered audio signals. A specific example of the activation penalty is a distance penalty that is a function of (a) the filtered audio object signals, (b) the desired perceived audio object signal position, and (c) a set of nominal speaker positions associated with the set of speakers. The distance penalty becomes larger when, for the same amount of overall filtered object audio signal level, more signal level is present in speakers whose nominal position is further from the desired perceived audio object position.

For the purposes of the remaining description, the following terms are defined:

TABLE 1

| Term | Definition |
|---|---|
| K | number of audio object signals, where K ≥ 1 |
| M | number of loudspeakers, where M ≥ 2 |
| N | number of listeners, where N ≥ 1 |
| $o_k$ | the kth audio object signal out of K |
| $s_m$ | the mth loudspeaker signal out of M |
| $e_{Ln}$ | the modelled signal at the left ear of nth listener out of N |
| $e_{Rn}$ | the modelled signal at the right ear of the nth listener out of N |
| $pos(o_k)$ | desired perceived position of the kth audio object signal |
| $pos(s_m)$ | assumed physical position of the mth loudspeaker |
| $npos(s_m)$ | nominal position of the mth loudspeaker |
| $pos(e_n)$ | assumed physical position of the nth listener |
| $s_k$ | the Mx1 vector of loudspeaker signals $s_m$ associated with the kth audio object |
| $e_k$ | the 2Nx1 vector of modelled listener binaural signals $e_{Ln}$ and $e_{Rn}$ associated with the kth audio object |
| $b_k$ | the 2Nx1 vector of desired listener binaural signals associated with the kth audio object |
| $R_k$ | the Mx1 vector of rendering filters associated with the kth audio object |

The loudspeaker signals associated with the kth audio object are given by the rendering filters applied to the object:

$$s_k = R_k o_k \tag{12}$$

The output of the renderer is given by the sum of all the individual object speaker signals $$s = \sum_{k=1}^{K} s_k = \sum_{k=1}^{K} R_k o_k \tag{13}$$

For example, Equation 13 corresponds to the one or more rendered signals 464 (see FIG. 4B), which is the sum of the rendered signals 462 for all of the individually rendered objects 460.

One goal of embodiments is to compute the set of rendering filters $R_k$ for each audio object such that a desired binaural signal $b_k$ is approximately produced at the set of L listeners while at the same time ensuring that the set of speaker signals associated with that object, the filtered audio object signals $R_k o_k$, is sparse. In particular, the solution should favor the activation of speakers whose nominal positions npos $(s_m)$ are close to the desired position of the audio object signal $pos(o_k)$.

The optimal set of rendering filters $R_k$ is achieved by minimizing, with respect to $R_k$, a cost function E consisting of a combination of a binaural error and an activation penalty:

$$\hat{R}_k = \min_{R_k}\{E(R_k R_k)\},\text{ where} \tag{14a}$$

$$E(R_k)=\text{comb}\{E_{binaural}(b_k,e_k),E_{activation}(s_k)\} \tag{14b}$$

The function co m b {A, B} is meant to represent a generic combination function which is monotonically increasing in both A and B. Examples of such a function include A+B, AB, $e^{A+B}$, $e^{AB}$, etc.

The binaural error function $E_{binaural}(b_k,e_k)$ computes an error between desired binaural signals $b_k$ at the listeners' ears and modelled binaural signals $e_k$ at the listeners' ears. The desired binaural signals $b_k$ are computed from the object signal $o_k$ and its associated desired perceived position pos ($o_k$). The modelled binaural signals $e_k$ are computed by modeling the playback of the filtered audio object signals $R_k o_k$ through the M loudspeakers from their assumed physical positions pos ($s_m$) to the N listeners at their assumed physical positions pos($e_n$).

The activation penalty $E_{activation}$ ($s_k$) computes a penalty based on the filtered object signals $s_k$. It is defined such that the function becomes large when significant amounts of signal level exists in speakers that are deemed undesirable for playback. The notion of "undesirable" may be defined in a variety of ways and may involve the combination of a variety of different criteria. For example, the activation penalty might be defined so that speakers distant from the desired position of the audio object being rendered are considered undesirably (e.g., a distance penalty), while at the same time speakers audible at a particular physical location, such as a baby's room, are undesirable (e.g., an audibility penalty).

One particularly useful embodiment of the activation penalty is a distance penalty $E_{distance}(s_k$, npos ($s_m$), pos($o_k$)) that defines a combined measure of the filtered object signals $s_k$, the nominal position of each speaker npos ($s_m$), and the desired audio object position pos($o_k$). The distance penalty has the property that for the same amount of overall filtered object signal level, where overall means combining across all speakers, the penalty increases when more of that energy is concentrated in speakers whose nominal position is more distant from the desired audio object position. In other words, the penalty is small when the majority of signal level is concentrated in speakers closer to the desired object position. The penalty is large when signal energy is concentrated in speakers further from the desired object position. The exact measure of "level" is not critical, but in general should correlate roughly to perceived loudness. Examples include root mean square (rms) level, weighted rms level, etc. Similarly, the exact measure of distance used to specify "closer" and "further" is not critical but should correlate roughly to spatial discrimination of audio. Examples include Cartesian distance and angular distance. The nominal positions of the loudspeakers npos ($s_m$) used in the distance penalty may be set equal to the actual assumed physical locations of the speakers pos($s_m$), but this is not a requirement. In some cases, as will be discussed later, it is useful to derive alternative nominal positions from the physical positions in order to affect the activation of speakers in a more diverse manner. Maintaining this separation allows such flexibility.

In summary of the general relation described by Equations 14, it is the addition of the activation penalty to the binaural error term which yields solutions to the generalized virtual spatial rendering system that are sparse in a perceptually beneficial manner and differentiate embodiments from the existing solutions discussed in the Background.

Similar to what is presented in the Background, the desired binaural signals $b_k$ may be generated by applying a set of binaural filters to the object signal $o_k$:

$$b_k=B_k o_k, \tag{15}$$

In the above equation, $B_k$ is a 2N×1 vector of left and right binaural filter pairs. Though not required, it is convenient to set the filter pairs the same for all N listeners:

$$B_k = \begin{bmatrix} B_L \\ B_R \\ B_L \\ B_R \\ \vdots \\ B_L \\ B_R \end{bmatrix} \tag{16}$$

This implies that we desire each of the N listeners to perceive the same binauralized version of $o_k$. The binaural filter pair may be chosen from an HRTF set indexed by the desired position of the audio object:

$$(B_L,B_R)=\text{HRTF}\{pos(o_k)\} \tag{17}$$

The modelled binaural signal at the ears may be computed using the generalized acoustic transmission matrix defined in Equation 9:

$$e_k = \begin{bmatrix} H_{L11} & H_{L12} & \dots & H_{L1M} \\ H_{R11} & H_{R12} & \dots & H_{R1M} \\ H_{L21} & H_{L22} & \dots & H_{L2M} \\ H_{R21} & H_{R22} & \dots & H_{R2M} \\ \vdots & \vdots & \vdots & \vdots \\ H_{LN1} & H_{LN2} & \dots & H_{LNM} \\ H_{RN1} & H_{RN2} & \dots & H_{RNM} \end{bmatrix} s_k \text{ or } e_k = Hs_k = HR_k o_k \tag{18}$$

Though not required, the elements of the matrix H may be chosen from the same HRTF set used to create the desired binaural signal, but now indexed by both the assumed physical listener position and the assumed physical speaker position:

$$(H_{Lnm},H_{Rnm})=\text{HRTF}\{pos(e_n),pos(s_m)\} \tag{19}$$

In many cases, an HRTF set will be listener-centered, and therefore the position of the speaker may be computed relative to that of the listener in order to compute a single index into the set, as in Equation 17.

With the desired binaural signal and the modeled binaural signal now specified, it is convenient to define the binaural error term of the cost function in Equation 14b as the squared error between desired and modeled signals:

$$E_{binaural}(b_k,e_k)=(e_k-b_k)^*(e_k-b_k)=(Hs_k-b_k)(Hs_k-b_k) \tag{20}$$

A convenient, yet still very flexible, definition of the activation penalty is a weighted sum of the power of the filtered object audio signal:

$$E_{activation}(s_k)=s_k^* W_k s_k \tag{21a}$$

where $$W_k = \begin{bmatrix} w_1 & & 0 \\ & w_2 & \\ & & \ddots & \\ 0 & & & w_M \end{bmatrix}, \; w_m = \text{Penalty}\{o_k, s_m\} \quad (21b)$$

The weight $w_m$=Penalty{$o_k$, $s_m$} defines the penalty of activating speaker m with signal from audio object k. In general, this penalty may be the combination of a variety of different terms, each aimed at achieving a different perceptual goal. For the distance penalty described above, the weight $w_m$ may be defined as:

$$w_m=\text{Distance}\{pos(o_k),\text{npos}(s_m)\} \quad (21c)$$

In the above equation, Distance{pos($o_k$), npos($s_m$)} is the distance between the desired object position and the nominal position of the speaker. A variety of functions for distance may be used. Cartesian distance, assuming an (x,y,z) positional representation of the object and speaker positions, produces reasonable results. However, given that HRTF sets are more often represented with polar coordinates, an angular distance may be more appropriate in some embodiments.

In the case where we simultaneously wish to penalize speakers audible in the baby's room (as discussed above regarding the audibility penalty), the weight $w_m$ may be defined to include an additional term:

$$w_m=\text{Distance}\{pos(o_k),\text{npos}(s_m)\}+Aud\{\text{baby},s_m\} \quad (21d)$$

Here, Aud{baby, $s_m$} defines some measure of audibility of speaker in in the baby's room. For example, the inverse of the distance of speaker in to the baby's room could be used as a proxy for audibility.

The virtualization techniques described herein may break down and become perceptually unstable at higher frequencies where the audio wavelength becomes very small in comparison to the physical spacing between speakers. As such, it is typical to band-limit systems using cross-talk cancellation and employ some other rendering technique, such as amplitude panning, above the cutoff. In such a hybrid approach for the present invention it is desirable to harmonize the activation of speakers between the high and low frequencies. One way to achieve this is to define the activation penalty in terms of the panning gains derived by the amplitude panner operating in the higher frequency range. In other words, penalize the activation of speakers that have not been activated by the amplitude panner. In such a system, the activation penalty weights may be defined as $$w_m = \frac{1}{\text{Pan}\{o_k, s_m\} + \varepsilon} \quad (21e)$$

where Pan{$o_k$, $s_k$} is the panning gain at higher frequencies for object k into speaker m, and epsilon is a small regularization term to prevent dividing by zero. U.S. Pat. No. 9,712,939 describes an amplitude panning technique called Center of Mass Amplitude (CMAP), which utilizes a distance penalty similar to Equations 21a-c. As such, the gains of the CMAP panner may be utilized in Equation 21e as another embodiment of the distance penalty defined herein.

With both elements of the cost function defined, it is convenient to define their combination as a simple sum:

$$E(R_k)=E_{binaural}(\quad)+E_{activation}(\quad)=(Hs_k-b_k)^*(Hs_k-b_k)+s_k{}^*W_ks_k \quad (22)$$

With the overall cost function thusly defined, the goal is to next find the optimal rendering filters $\hat{R}_k$ which minimize the function. Realizing that $s_k=R_ko_k$, one may differentiate the expression in Equation 22 with respect to $s_k$ and set to zero. Doing so results in the following solution for $s_k$ $$\frac{\partial E}{\partial s_k} = 0 \Rightarrow s_k = (H^*H + W)^{-1}H^*b_k = (H^*H + W)^{-1}H^*B_ko_k \quad (23)$$

Given that $s_k=R_ko_k$, the result in Equation 23 implies that the optimal filters are given by $$\hat{R}_k=(H^*H+W)^{-1}H^*B_k \quad (24)$$

In practice, this solution yields reasonable results, but it has the drawback that, in general, it does not result in the binaural error being set to zero when conditions allow it. For example, when 2N≤M, there do exist solutions, such as the pseudo-inverse, that will guarantee zero binaural error. However, the addition of the activation penalty in the particular formulation of the cost function in Equation 22 prevents this from happening. In reality, the activation penalty should be scaled carefully in order to minimize the binaural error to a reasonable level while still maintaining meaningful sparsity.

For the case where zero binaural error is achievable, 2N≤M, an alternate formulation of the cost function based on the theory of Lagrange multipliers may be utilized so that zero binaural error is achieved precisely. At the same time, sparsity is enforced without having to worry about the absolute scaling of the activation penalty. In this formulation, the activation penalty remains the same as in Equations 21, but the binaural error is changed to the difference between the desired and modeled binaural signals pre-multiplied with an unknown vector Lagrange multiplier λ.

$$E_{binaural}(\quad)=\lambda^*(Hs_k-b_k) \quad (25)$$

The binaural error and activation penalty are again combined through simple addition to formulate the overall cost function $$E(\quad)=\lambda^*(Hs_k-b_k)+s_k{}^*W_ks_k \quad (26)$$

Setting the partial derivatives of the cost function with respect to both $s_k$ and Δto zero yields the unique solution for $s_k$ that minimizes the activation penalty subject to zero binaural error $$\left.\begin{array}{l} \frac{\partial E}{\partial s_k} = 0 \\ \frac{\partial E}{\partial \lambda} = 0 \end{array}\right\} \Rightarrow s_k = W_k^{-1}H^*\left(HW_k^{-1}H^*\right)^{-1}b_k = W_k^{-1}H^*\left(HW_k^{-1}H^*\right)^{-1}B_ko_k \quad (27)$$

Given that $s_k=R_ko_k$, the result in Equation 27 implies that the optimal filters are given by $$\hat{R}_k=W_k{}^{-1}H^*(HW_k{}^{-1}H^*)^{-1}B_k \quad (28)$$

In practice it has been found that designing the disclosed system for more than one listener yields diminishing returns. A good tradeoff for performance and complexity appears to be achieved by assuming a single listener, N=1, and then relying on the sparsity constraint to make the system work reasonably well for listeners who may be located at positions other than the one assumed in the formulation. Since a single listener guarantees 2N≤M for M≥2, the solution in Equation 28 can be used and is therefore preferred since it guarantees zero binaural error. It also has the nice property of simplifying exactly to the solution of the standard two speaker cross-talk canceller when M=2 and N=1.

As discussed above, FIG. 2A shows an arbitrary arrangement 250 of loudspeakers. Embodiments described herein are beneficial for such arbitrary arrangements by virtue of the process of deriving the filters by minimizing the cost function (see 402 in FIG. 4A).

Also as discussed above, U.S. Application Pub. No. 2015/0245157 describes a system for virtual audio rendering of object based audio is described wherein a single audio object is panned between multiple sets of traditional 2-speaker/1-listener crosstalk cancellers as a function of the object's position. The goal of the system in U.S. Application Pub. No. 2015/0245157 is similar to that of the presently disclosed embodiments in that the panning is designed to provide a more robust spatial presentation for listeners located out of the sweet spot. However, the system of U.S. Application Pub. No. 2015/0245157 is restricted to multiple pairs of loudspeakers, and the panning function must be hand tailored to the particular layout of these pairs.

Figure 5:
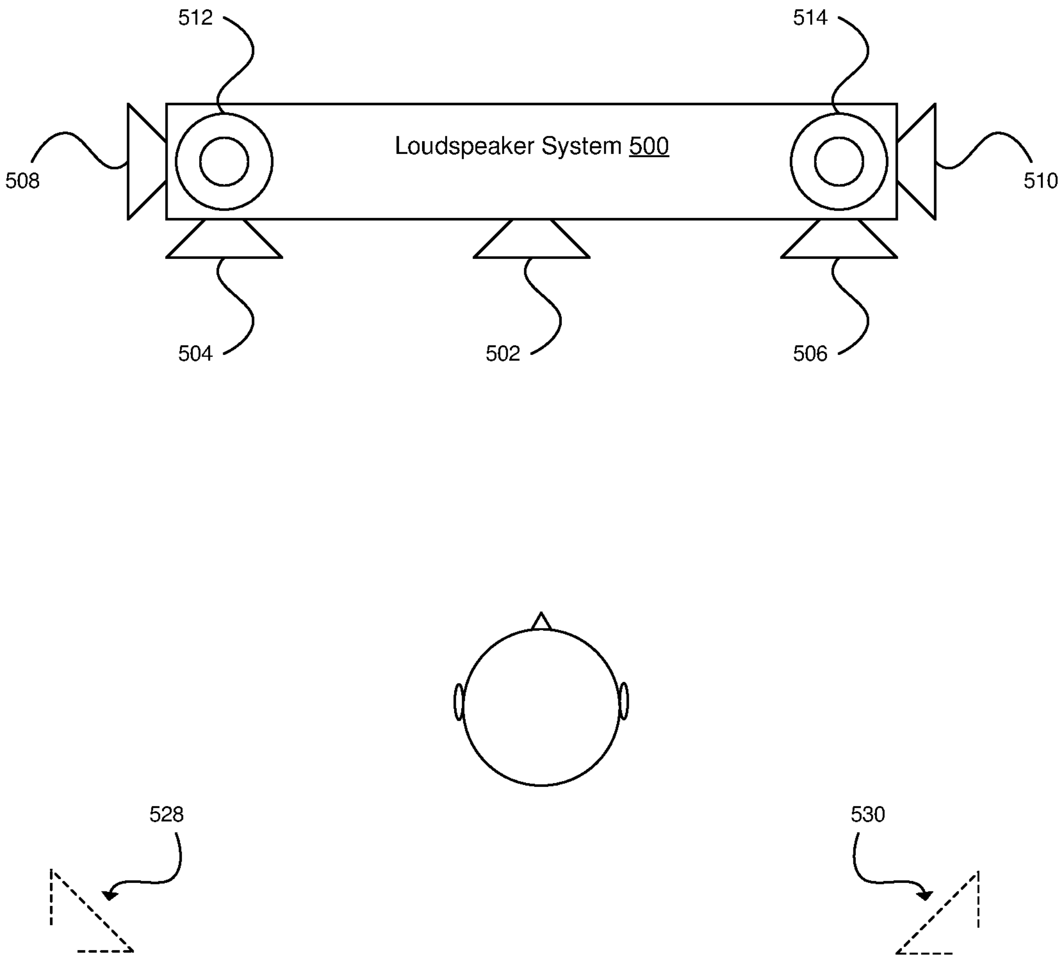
FIG. 5 is a top view of a loudspeaker system 500.

Embodiments described herein achieve similar behavior in a much more flexible and elegant manner by simply assigning nominal positions to loudspeakers that are different from their physical positions, as shown with reference to FIG. 5.

FIG. 5 is a top view of a loudspeaker system 500. The loudspeaker system 500 is similar to the loudspeaker system 200 (see FIG. 2B), and includes the rendering system 300 (see FIG. 3) that implements the method 400 (see FIG. 4A), as described above. The loudspeaker system 500 also includes a center loudspeaker 502, a left front loudspeaker 504, a right front loudspeaker 506, a left side loudspeaker 508, a right side loudspeaker 510, a left upward loudspeaker 512, and a right upward loudspeaker 514. Differently from the loudspeaker system 200, the loudspeaker system 500 assigns the left side loudspeaker 508 to a nominal position 528 and the right side loudspeaker 510 to a nominal position 530, both behind the listener. Similarly, nominal positions for the top pair may be assigned to locations above the listener. Nominal positions for the front pair may be set equal to their physical positions. Using this configuration, the activation penalty (e.g., the distance penalty) of the embodiments described herein will result in speaker activations similar to those described in U.S. Application Pub. No. 2015/0245157, but without the crafting of any rules specific to the layout. Instead, loudspeakers will automatically be activated when the position of an object is close to the loudspeakers' nominal positions. In addition, because the embodiments described herein are not restricted to multiple pairs of cross-talk cancellers (as described above regarding U.S. Application Pub. No. 2015/0245157), the center channel may be integrated directly into the task of designing the optimal rendering filters, and no special consideration is required.

The nominal position of a loudspeaker may be derived by expanding one or more physical positions of the loudspeakers into an arrangement around an assumed physical set of listening positions.

Figure 6:
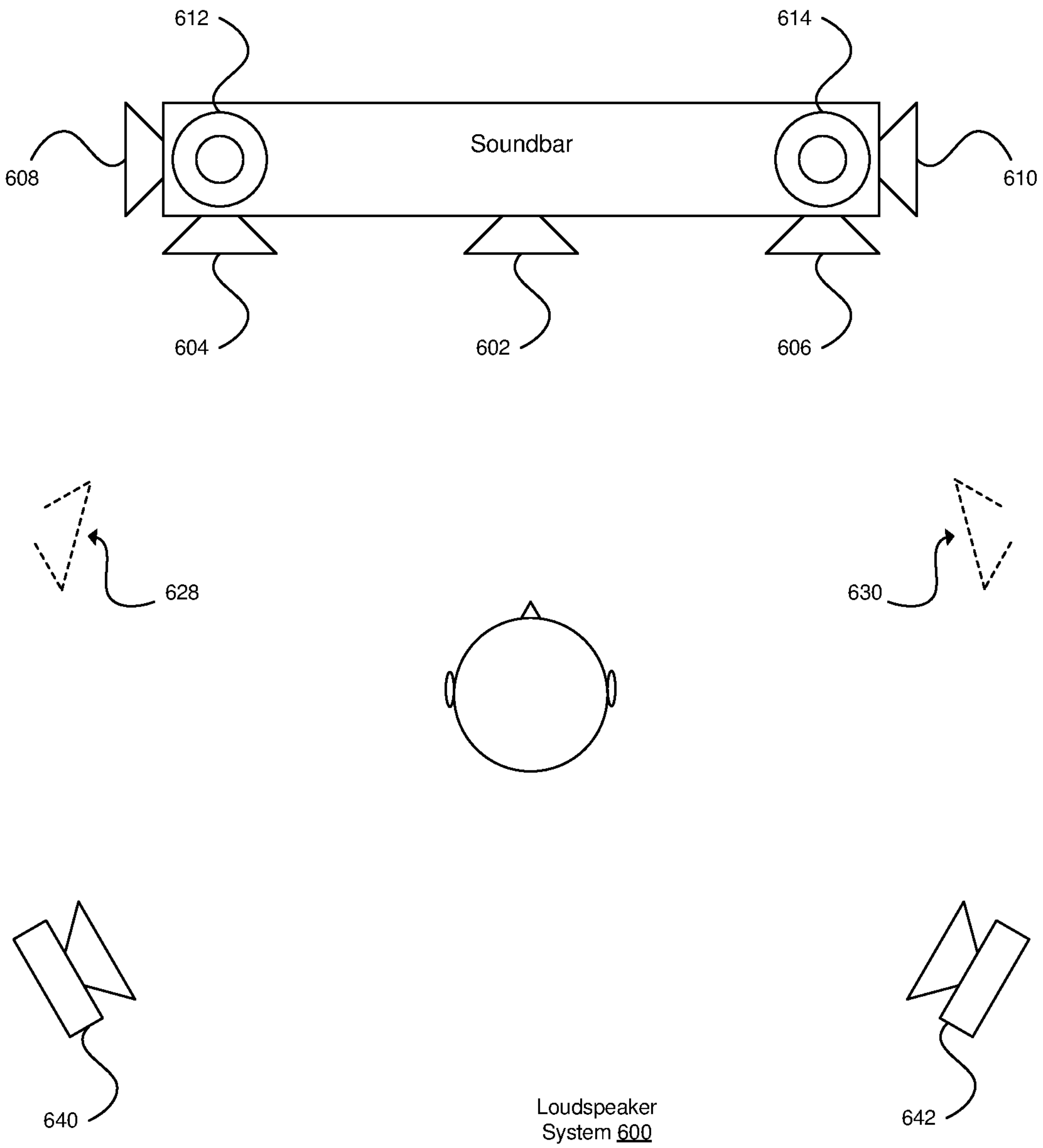
FIG. 6 is a top view of a loudspeaker system 600.

FIG. 6 is a top view of a loudspeaker system 600. The loudspeaker system 600 is similar to the loudspeaker system 500 (see FIG. 5), and includes the rendering system 300 (see FIG. 3) that implements the method 400 (see FIG. 4A), as described above. The loudspeaker system 600 also includes a center loudspeaker 602, a left front loudspeaker 604, a right front loudspeaker 606, a left side loudspeaker 608, a right side loudspeaker 610, a left upward loudspeaker 612, and a right upward loudspeaker 614 in a soundbar form factor. The loudspeaker system 600 also includes a left rear loudspeaker 640 and a right rear loudspeaker 642. The sound bar component of the loudspeaker system 600 may communicate with the rear loudspeakers 640 and 642 via a wired or wireless connection, e.g. to provide the corresponding rendered audio signals 304 (see FIG. 3). Similarly to the loudspeaker system 500, the loudspeaker system 600 assigns the left side loudspeaker 608 to a nominal position 628 to the left of the listener, and assigns the right side loudspeaker 610 to a nominal position 630 to the right of the listener.

The loudspeaker system 600 illustrates how the embodiments disclosed herein may easily adapt to the presence of additional loudspeakers. Taking the physical positions of the additional loudspeakers 640 and 642 into account, the nominal positions of the side loudspeakers 608 and 610 on the soundbar may be moved to the locations 628 and 630 shown, halfway between the soundbar and the physical rear speakers. In this configuration, as an audio object travels from front to rear, the system will automatically pan its perceived position between the front speakers, the side speakers, and then the rear speakers, all as a consequence of the activation penalty (e.g., the distance penalty) utilized in the optimization of the rendering filters.

Figure 7A:
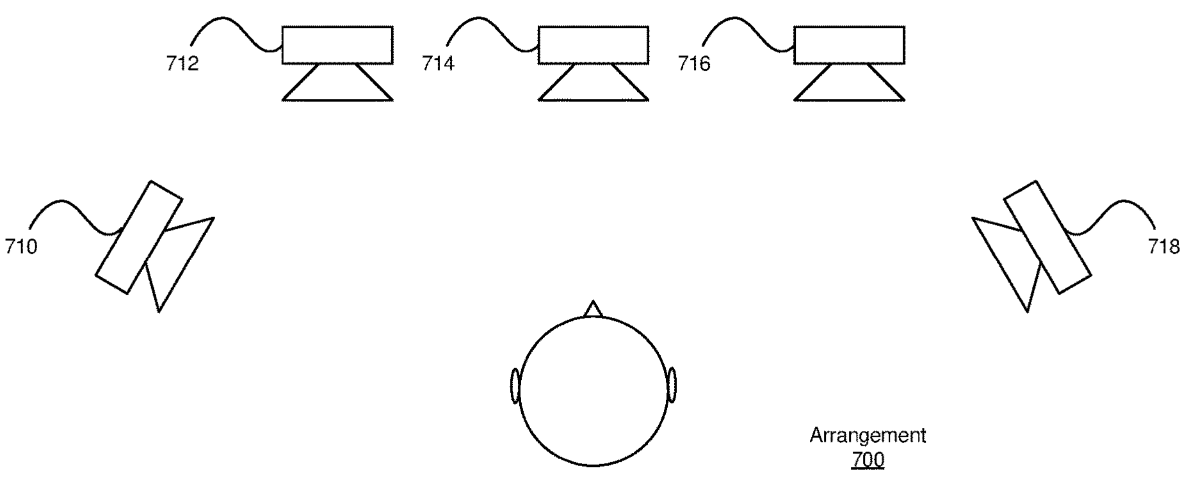
FIGS. 7A-7B are top views of loudspeaker arrangements 700 and 702.
Figure 7B:
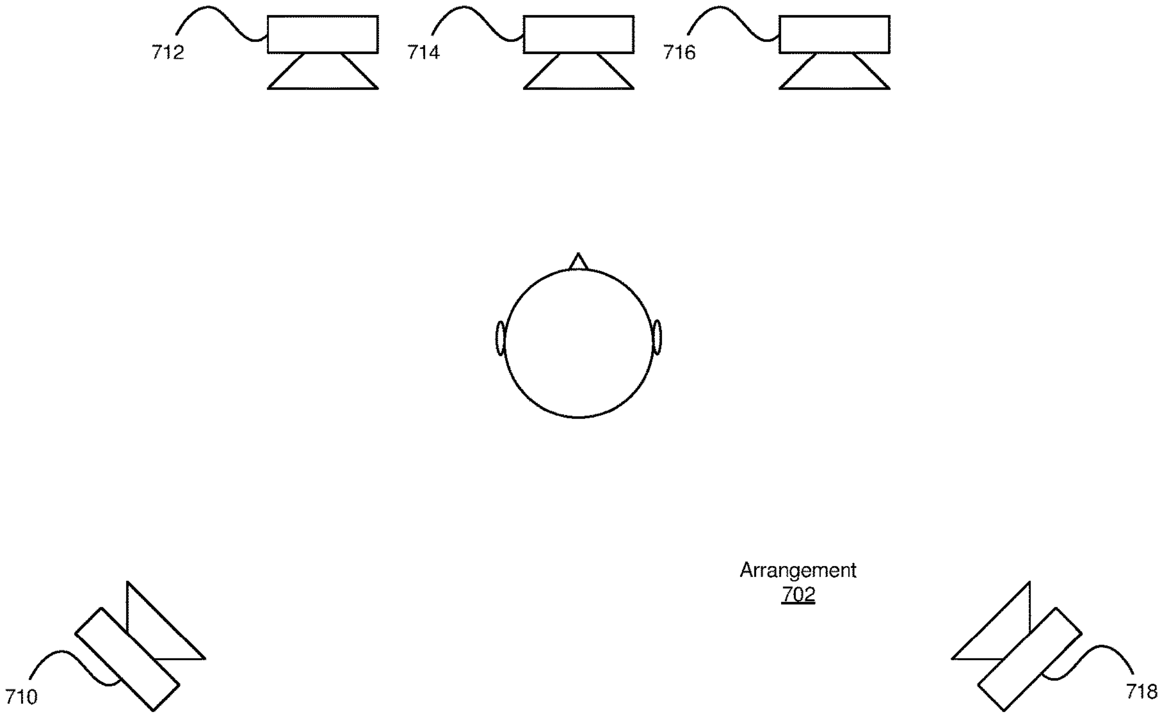

FIGS. 7A-7B are top views of loudspeaker arrangements 700 and 702. Both of the arrangements 700 and 702 include five loudspeakers 710, 712, 714, 716 and 718. The loudspeakers 710, 712, 714, 716 and 718 may also each include a microphone, as described in International Publication No. WO 2018/064410 A1. The microphone enables each loudspeaker to determine the positions of the other loudspeakers by detecting the audio output from the other loudspeakers, and to determine the position of listeners by detecting the sounds made by the listeners. Alternatively, the microphones may be discrete devices, separate from the loudspeakers.

The difference between FIGS. 7A and 7B is the different arrangements 700 and 702 for the loudspeakers 710, 712, 714, 716 and 718. For example, the loudspeakers may initially be arranged in the arrangement 700 of FIG. 7A, then may be re-arranged into the arrangement 702 of FIG. 7B. The embodiments described herein facilitate the arbitrary placement, and arbitrary rearrangement, of the loudspeaker arrangements, as described with reference to FIG. 8.

Figure 8:
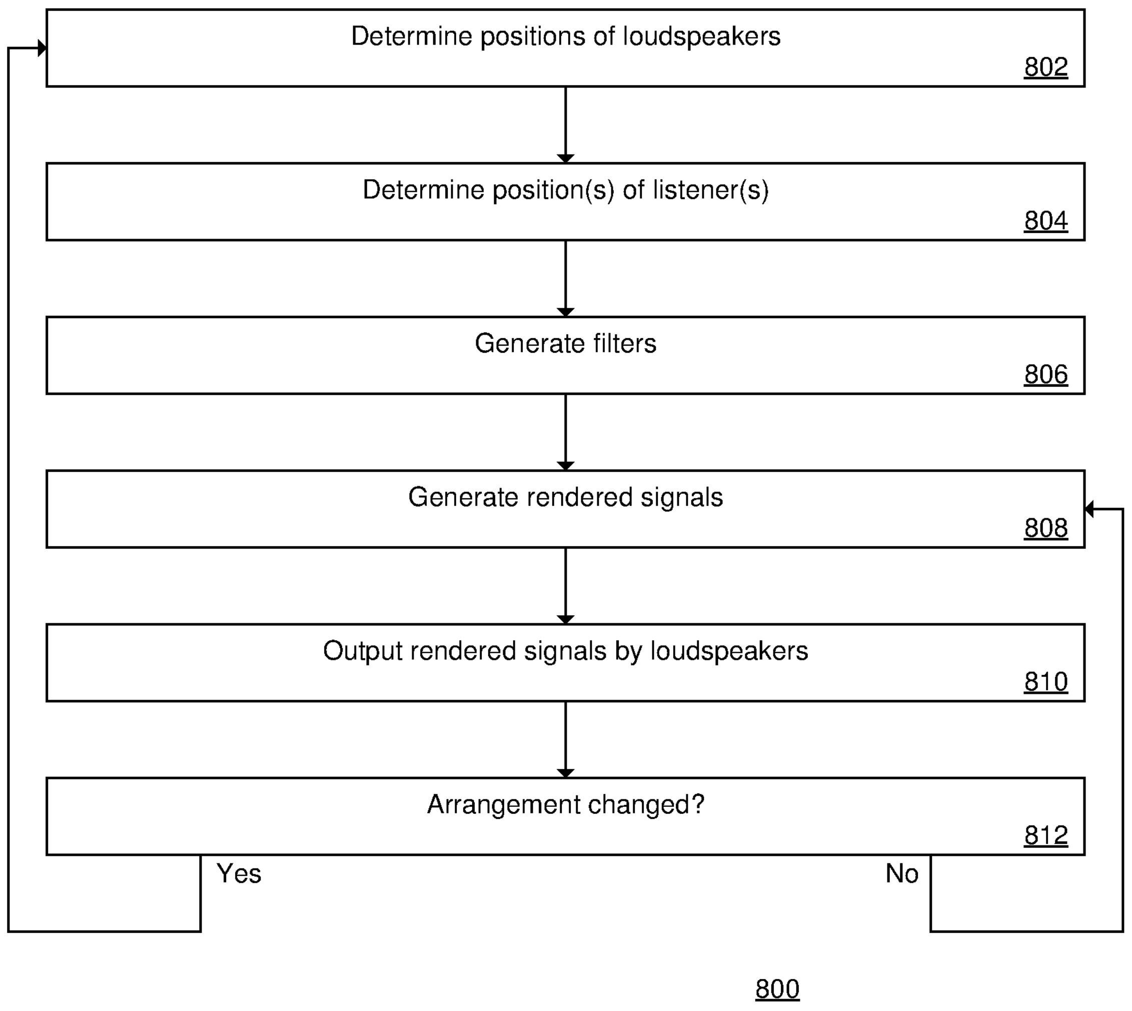
FIG. 8 is a flowchart of a method 800 of determining filters for a loudspeaker arrangement.

FIG. 8 is a flowchart of a method 800 of determining filters for a loudspeaker arrangement. The method 800 may be implemented by the loudspeakers 710, 712, 714, 716 and 718 (see FIG. 7A and FIG. 7B), for example by executing one or more computer programs.

For the two solutions given by Equations 24 and 28, one notes that the solution for the filters is completely independent of the object signal $o_k$ itself. Both solutions depend on the transmission matrix H, the weight matrix $W_k$, and the binaural filter vector $B_k$. Combined, these terms are in turn dependent on the desired position of the object $pos(o_k)$, the physical position of the listeners $pos(e_n)$, the physical position of the speakers $pos(s_m)$, and the nominal position on the speakers $npos(s_m)$. The method 800 operates based on these observations.

At 802, the positions of a plurality of loudspeakers are determined. For example, given the arrangement 700 (see FIG. 7A), the loudspeakers 710, 712, 714, 716 and 718 may determine their positions by outputting audio and by detecting the outputs received from each other loudspeaker (e.g., by using a microphone). The positions may be relative positions, e.g. based on the position of one of the loudspeakers as a reference position.

At 804, the position(s) of one or more listeners is determined. For example, given the arrangement 700 (see FIG.

7A), the loudspeakers 710, 712, 714, 716 and 718 may determine the position of the listener by using their microphones. If the loudspeakers detect multiple listeners, they may average their positions into a single listener position, so that the N=1 assumption may be used as discussed above with reference to Equation 28. Alternatively, 804 may be omitted.

At 806, a plurality of filters are generated. In general, these filters are generated according to 402 (see FIG. 4A), using the loudspeaker positions (see 802) and the listener positions (see 804) as the inputs for the filter equations discussed above. For example, given the arrangement 700 (see FIG. 7A), the loudspeakers 710, 712, 714, 716 and 718 may generate the filters using the process 402 (see FIG. 4A) and equations described above. When 804 is omitted, the filters may be generated based only on the loudspeaker position information (see 802).

At this point, the system may assume that the loudspeaker positions and the listener positions may remain stationary, and may generate the filters as a lookup table of optimal rendering filters indexed by desired position of the audio object. Since these filters are not dependent on the actual object signal being rendered, only its desired position, each of the K object signals may be rendered using this same lookup table.

The steps 802, 804 and 806 may be referred to as a configuration phase or a setup phase. The configuration phase may be initiated by the listener, e.g. by pushing a configuration button on one of the loudspeakers, or by providing an audible command that is received by the microphones. After the configuration phase, the process continues with steps 808, 810 and 812, which may be referred to as an operational phase.

At 808, an audio object is rendered using the plurality of filters to generate a plurality of rendered signals. This step is generally similar to the step 410 (see FIG. 4A) discussed above. For example, given the arrangement 700 (see FIG. 7A), the loudspeakers 710, 712, 714, 716 and 718 may receive one or more audio objects and may render the audio object using the filters to generate the plurality of rendered signals.

At 810, the plurality of rendered signals is output by the plurality of loudspeakers. This step is generally similar to the step 412 (see FIG. 4A) discussed above. For example, given the arrangement 700 (see FIG. 7A), the loudspeakers 710, 712, 714, 716 and 718 may each output its respective rendered signal as audible sound.

At 812, it is evaluated whether the loudspeaker arrangement is changed. The step 812 may be initiated by a user (e.g., the listener pushes a reconfiguration button, provides a voice command, etc.), may be initiated periodically by the system itself (e.g., performing the evaluation periodically, performing the evaluation continuously by using the microphones to detect the sound output from each other loudspeaker, etc.), etc. If the arrangement has changed, the method returns to 802 and re-determines the positions of the loudspeakers. If the arrangement has not changed, the method continues with the operational phase as per 808. For example, the loudspeakers 710, 712, 714, 716 and 718 may have been in the arrangement 700 (see FIG. 7A), may have been changed to the arrangement 702 (see FIG. 7B), and may have received a voice command to re-generate the filters; the method then returns to 802.

Although the method 800 has been described in the context of rearranging the loudspeakers (e.g., from the arrangement 700 of FIG. 7A to the arrangement 702 of FIG. 7B), the method 800 may also include adding an additional loudspeaker to the arrangement (which may also include, or not include, rearranging the existing loudspeakers); removing one of the loudspeakers from the arrangement (which may also include, or not include, rearranging the remaining loudspeakers); and re-generating the filters according to changing the listener positions (see 804) without rearranging the loudspeakers (see 802).

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of rendering audio, the method comprising:

deriving a plurality of filters, wherein each of the plurality of filters is associated with a corresponding one of a plurality of loudspeakers, wherein deriving the plurality of filters includes:

defining a binaural error for an audio object using the plurality of filters, wherein the audio object is associated with a desired perceived position, defining an activation penalty for the audio object using the plurality of filters, and minimizing a cost function that is a combination of the binaural error and the activation penalty for the plurality of filters;

rendering the audio object using the plurality of filters to generate a plurality of rendered signals; and outputting, by the plurality of loudspeakers, the plurality of rendered signals, wherein the activation penalty is based on a plurality of physical positions of the plurality of loudspeakers, wherein the activation penalty is a weighted sum of a power of the plurality of rendered signals, and wherein the activation penalty is based on an angular distance.

2. The method of claim 1, wherein the binaural error is a difference between desired binaural signals related to at least one listener position and modeled binaural signals related to the at least one listener position.

3. The method of claim 2, wherein the desired binaural signals are defined based on the audio object and the desired perceived position of the audio object.

4. The method of claim 2, wherein the desired binaural signals are defined using one of a database of head-related transfer functions (HRTFs) and a parametric model of HRTFs.

5. The method of claim 2, wherein the modeled binaural signals are defined by modeling a playback of the plurality of rendered signals, through the plurality of loudspeakers having a plurality of nominal loudspeaker positions, based on the at least one listener position.

6. The method of claim 2, wherein the modeled binaural signals are defined using one of a database of head-related transfer functions (HRTFs) and a parametric model of HRTFs.

7. The method of claim 1, wherein the activation penalty associates a cost with assigning signal energy among the plurality of loudspeakers.

8. The method of claim 1, wherein the activation penalty is a distance penalty, wherein the distance penalty is defined based on the plurality of rendered signals, a plurality of nominal loudspeaker positions for the plurality of loudspeakers, and the desired perceived position of the audio object.

9. The method of claim 1, wherein the cost function is a combination function that is monotonically increasing in both A and B, wherein A corresponds to the binaural error and B corresponds to the activation penalty.

10. The method of claim 9, wherein the cost function is one of A+B, AB, $e^{A+B}$, and $e^{AB}$.

11. The method of claim 1, wherein the plurality of loudspeakers has a plurality of nominal loudspeaker positions, wherein each of the plurality of nominal loudspeaker positions is one of a first position and a second position, wherein the first position is an actual loudspeaker position of a corresponding one of the plurality of loudspeakers, and wherein the second position is other than the actual loudspeaker position.

12. The method of claim 1, wherein one of the plurality of loudspeakers has a nominal loudspeaker position, wherein the nominal loudspeaker position is derived by expanding one or more of the plurality of physical positions of the plurality of loudspeakers.

13. The method of claim 1, wherein the plurality of filters are independent of the audio object.

14. The method of claim 1, wherein the plurality of physical positions of the plurality of loudspeakers are determined in a setup phase.

15. The method of claim 1, wherein the activation penalty is an audibility penalty, wherein the audibility penalty increases the activation penalty for a given loudspeaker of the plurality of loudspeakers that is nearby a defined location.

16. The method of claim 1, wherein the activation penalty is based on a perceived loudness and a distance between the desired perceived position of the audio object and a given loudspeaker of the plurality of loudspeakers.

17. The method of claim 1, wherein the activation penalty adjusts a plurality of panning gains derived by an amplitude panner.

18. The method of claim 1, wherein the angular distance is represented in polar coordinates.

19. A non-transitory computer readable medium storing a computer program that, when executed by a processor, controls an apparatus to execute processing including the method of claim 1.

20. An apparatus for rendering audio, the apparatus comprising:

a plurality of loudspeakers; and at least one processor, wherein the at least one processor is configured to derive a plurality of filters, wherein each of the plurality of filters is associated with a corresponding one of the plurality of loudspeakers, wherein deriving the plurality of filters includes:

defining a binaural error for an audio object using the plurality of filters, wherein the audio object is associated with a desired perceived position, defining an activation penalty for the audio object using the plurality of filters, and minimizing a cost function that is a combination of the binaural error and the activation penalty for the plurality of filters, wherein the at least one processor is configured to render the audio object using the plurality of filters to generate a plurality of rendered signals, wherein the plurality of loudspeakers is configured to output the plurality of rendered signals, and wherein the activation penalty is based on a plurality of physical positions of the plurality of loudspeakers, wherein the activation penalty is a weighted sum of a power of the plurality of rendered signals, and wherein the activation penalty is based on an angular distance.

* * * * *